Patented Oct. 24, 1944

2,361,015

UNITED STATES PATENT OFFICE 2,361,015

METHOD OF RECLAIMING VULCANIZED BALATA AND THE PRODUCT THEREOF

Paul J. Dasher, Stow, Ohio, assignor to The B. F. Goodrich Company, New York, N. Y., a corporation of New York No Drawing. Application May 2, 1942, Serial No. 441,545

8 Claims. (Cl. 260—720)

This invention relates to a method of reclaiming vulcanized balata and to the reclaimed balata that is prepared thereby.

Balata has long been known as a material whose characteristics make it very valuable for certain specific uses, such as for making transmission belts, golf ball covers, covering for underwater electrical cables, and other articles, where its properties of high di-electric strength, toughness, wearing ability, and resistance to penetration by fluids can be utilized. It was thought for a long time that balata could not be vulcanized and it was, therefore, always used in the unvulcanized state, but in relatively recent years it has been discovered that balata can be vulcanized with sulfur to give it new and different properties. Upon vulcanization balata becomes softer with greater resiliency and elasticity than the unvulcanized material; thus vulcanized balata is suited for new uses that were not open to the unvulcanized balata. It is an object of this invention to provide a method of reclaiming vulcanized balata so that it may be reused like crude balata, i. e., either in an unvulcanized condition or vulcanized over again.

I have discovered that vulcanized balata may be reclaimed by heating it in the presence of an aliphatic polyamine until the hot balata becomes plastic. This reclaimed balata is soft and plastic when hot but upon cooling becomes hard and stiff like ordinary unvulcanized balata.

The aliphatic polyamines used in this invention may be either straight-chain or cyclic aliphatic compounds and may be unsubstituted or substituted by any of the ordinary substituents so long as the chemical compound can be considered an aliphatic polyamine with the usual polyamine characteristics.

Typical examples of the above aliphatic polyamines are the aliphatic diamines such as ethylene diamine, 1,3-diamino propane, 1,2-diamino propane; the aliphatic triamines such as 1,2,3-triamino propane, triethyl diethylene triamine, diethylene triamine; the aliphatic tetramines such as triethylene tetramine; the aliphatic pentamines such as tetraethylene pentamine; the aliphatic hexamines such as pentaethylene hexamine; as well as miscellaneous compounds such as 2-(diethyl amino) ethylamine, 1,2-(methyl amino) ethane, 1,2-(dimethyl amino) ethane, 1,2-(ethyl amino) ethane, and the like. In general it has been found that the aliphatic diamines, tetramines, and pentamines are preferred for reclaiming balata although any of the large group of aliphatic polyamines may be used to produce excellent reclaimed balata. The amines may be used singly or in any desired combination or admixture.

In order to illustrate the use of some aliphatic polyamines in preparing the reclaimed balata according to this invention the following specific examples are set forth:

Example 1

1000 grams of vulcanized balata are broken up into small pieces, as by grinding, and mixed with 50 grams of 1,3-diamino propane. This mixture is introduced into an autoclave and heated at 400° F. for three hours, or until the hot balata becomes soft and plastic. On cooling the balata will be found to be hard and stiff like ordinary unvulcanized balata.

Example 2

90 pounds of ground vulcanized balata are mixed with 2 pounds of tetraethylene pentamine in a steam jacketed vessel and heated with steam at 300° F. for 10 hours or until the hot balata becomes plastic.

Example 3

1000 grams of ground vulcanized balata are mixed with 50 grams of diethylene triamine and heated in an inverted autoclave at 392° F. for 20 minutes, or until the hot balata becomes plastic.

Example 4

100 pounds of ground vulcanized balata are mixed with 2 pounds of triethylene tetramine and introduced into a Banbury mixer. This mixture is heated at 350° F. and, while the heat is maintained, is worked for 30 minutes, or until the hot balata becomes plastic. This heat may be initially started with steam and then maintained, either completely or in part, by the the mechanical working of the balata in the Banbury.

In the present invention heating is definitely essential but the heating conditions are subject to considerable variation. As has been stated throughout this specification it is only necessary that the mixture of vulcanized balata and reclaiming agent be heated until the hot balata becomes soft and plastic. In ordinary commercial manufacturing operations the heating period may vary from as low as twenty minutes or less to as high as twenty-four hours or more, while the temperatures may vary from 200° F. to around 450° F. or higher; the higher temperatures ordinarily being employed for shorter periods and the lower temperatures for longer periods. In all instances, however, it is absolutely necessary that the heating shall be continued until the hot balata is reduced to a soft, plastic condition, which condition will be readily recognized by a worker familiar with the art. Similarly the quantity of aliphatic polyamine used in this invention is not critical but may vary widely. Best results generally are obtained by using from about 0.5 pound to about 15 pounds of polyamine to every 100 pounds of vulcanized balata to be reclaimed.

Having described my invention together with several preferred examples of materials to be used and methods to be followed in practicing it, it is my desire that the invention be not limited by these but rather be construed broadly within the spirit and scope of the invention as defined by the appended claims.

I claim:

1. The method of reclaiming vulcanized balata which comprises associating the vulcanized balata with an aliphatic polyamine and heating the associated materials at a temperature not substantially lower than 200° F. until the hot balata becomes plastic.

2. The method of reclaiming vulcanized balata which comprises associating the vulcanized balata with an aliphatic diamine and heating the associated materials at a temperature not substantially lower than 200° F. until the hot balata becomes plastic.

3. The method of reclaiming vulcanized balata which comprises associating the vulcanized balata with an aliphatic tetramine and heating the associated materials at a temperature not substantially lower than 200° F. until the hot balata becomes plastic.

4. The method of reclaiming vulcanized balata which comprises associating the vulcanized balata with an aliphatic pentamine and heating the associated materials at a temperature not substantially lower than 200° F. until the hot balata becomes plastic.

5. A reclaimed balata that has been prepared by heating vulcanized balata in the presence of an aliphatic polyamine at a temperature not substantially lower than 200° F. until the hot balata becomes plastic.

6. A reclaimed balata that has been prepared by heating vulcanized balata in the presence of an aliphatic diamine at a temperature not substantially lower than 200° F. until the hot balata becomes plastic.

7. A reclaimed balata that has been prepared by heating vulcanized balata in the presence of an aliphatic tetramine at a temperature not substantially lower than 200° F. until the hot balata becomes plastic.

8. A reclaimed balata that has been prepared by heating vulcanized balata in the presence of an aliphatic pentamine at a temperature not substantially lower than 200° F. until the hot balata becomes plastic.

PAUL J. DASHER.